US007040641B2

(12) United States Patent
Wing

(10) Patent No.: US 7,040,641 B2
(45) Date of Patent: May 9, 2006

(54) TRANSPORT CHAIR FOR A PATIENT

(76) Inventor: Thomas W. Wing, 1326 W. Baseline Rd., Claremont, CA (US) 91711

( * ) Notice: Subject to any disclaimer, the term of this patent is extended or adjusted under 35 U.S.C. 154(b) by 0 days.

(21) Appl. No.: 11/017,603

(22) Filed: Dec. 20, 2004

(65) Prior Publication Data

US 2005/0104319 A1 May 19, 2005

Related U.S. Application Data

(63) Continuation-in-part of application No. 10/424,328, filed on Apr. 28, 2003, now Pat. No. 6,902,178.

(51) Int. Cl.
*B62H 7/00* (2006.01)

(52) U.S. Cl. ................ 280/304; 280/304.1; 280/304.3; 280/304.4; 297/429; 297/DIG. 4; 297/DIG. 1

(58) Field of Classification Search ................ 280/304, 280/304.1, 304.3, 304.4
See application file for complete search history.

(56) References Cited

U.S. PATENT DOCUMENTS 3,023,048 A 2/1962 Barton
3,398,972 A * 8/1968 Ekengard ................. 280/764.1
3,398,974 A 8/1968 Edwards et al.
3,905,436 A 9/1975 Karchak et al.
4,506,930 A * 3/1985 Lambert ................ 297/423.11
4,511,157 A 4/1985 Wilt, Jr.
4,744,578 A 5/1988 Stearns
4,893,827 A 1/1990 Gay et al.
4,948,156 A 8/1990 Fortner
5,186,585 A 2/1993 Sousa et al.
5,255,934 A 10/1993 Wilson
5,398,357 A 3/1995 Foster
5,601,302 A * 2/1997 Beard et al. ............. 280/250.1
6,089,593 A * 7/2000 Hanson et al. .............. 280/650
6,315,319 B1 * 11/2001 Hanson et al. .............. 280/650
6,430,761 B1 * 8/2002 Brandorff et al. ............. 5/86.1
D473,826 S 4/2003 Schlangen et al.
6,561,524 B1 5/2003 Medina
2003/0042779 A1 * 3/2003 Yamasaki et al. ...... 297/262.13

* cited by examiner

*Primary Examiner*—Lesley D. Morris
*Assistant Examiner*—Marlon Arce-Diaz
(74) *Attorney, Agent, or Firm*—Stetina Brunda Garred & Brucker

(57) ABSTRACT

Disclosed is a wheelchair for transporting a patient. The wheelchair comprises a support frame having a front, a rear, and opposing sides with the front and rear facing in respective forward and aft directions and the opposing sides facing in opposing lateral directions. The wheelchair further comprises at least two main wheels mounted on the support frame and a seat base disposed upon the support frame between the main wheels. The seat base is configured for selectively raising and lowering the patient between a first level and a second level with the aid of at least one security beam disposed adjacent one of the main wheels. The security beam may have a substantially vertical orientation and may be configured as a hand hold for steadying the patient when transferring onto and off of the seat base.

27 Claims, 7 Drawing Sheets

TRANSPORT CHAIR FOR A PATIENT

CROSS-REFERENCE TO RELATED APPLICATIONS

This application is a continuation-in-part of U.S. application Ser. No. 10/424,328, filed Apr. 28, 2003, now U.S. Pat. No. 6,902,178 the entire contents of which are hereby incorporated by reference.

STATEMENT RE: FEDERALLY SPONSORED RESEARCH/DEVELOPMENT (Not Applicable)

BACKGROUND OF THE INVENTION

The present invention pertains generally to wheelchairs and, more particularly, a uniquely configured wheelchair specifically adapted for transferring a physically challenged patient into and out of the wheelchair under the patient's own power or with the assistance of no more than one person.

There exists in the prior art, wheelchairs that are configured to provide some degree of mobility to non-ambulatory or physically challenged patients. Some of these patients are confined to a wheelchair due to a variety of conditions, including progressive neurological degeneration wherein the patient may be unable to move without the combined efforts of at least two people to lift the patient into and out of the wheelchair. For example, it may be desirable to relocate the patient from a bed in a bedroom to a living room chair in a living room. Unable to move under their own power due to lack of balance or muscular strength, the patient must be physically lifted from the bed, placed into the wheelchair, wheeled into the living room, and then lifted again out of the wheelchair and into the living room chair.

The lifting usually must be performed by two people or caregivers possessing sufficient strength, as one caregiver may not possess sufficient strength. In addition, the patient typically cannot be without a caregiver for more than six hours per day. Furthermore, the patient may require the assistance of a caregiver during the night in order to utilize bathroom facilities. Nursing homes may provide the assistance of caregivers who are specifically employed and trained to move nursing home patients. Such caregivers in nursing homes can lift and move the patient at various times during the day and night, as needed. However, the cost of nursing homes is prohibitively expensive. The high cost of nursing homes and hospitals may not be covered under government health care plans or private health care insurance. Employing a full-time live in caregiver is equally expensive. Finally, insurance costs may prohibit live-in caregivers and nursing home caregivers from moving the patient outside the confines of the patient's home or the nursing home.

In attempts to overcome the above mentioned limitations, electric wheelchairs have been developed. These electric wheelchairs include options such as powered seats that operate in a manner similar to the powered seats available in many automobiles. These powered seats may include a seat height adjustment capability that allows the patient to be raised above the level of an object to which the patient may be transferred. The lifting capability of the powered seats partially solves the lifting problem in that the need for two caregivers to lift the patient is eliminated. However, powered wheelchairs may cost many thousands of dollars and thus may be unaffordable to the same people unable to afford the high cost of nursing homes. Furthermore, for patients having a diminished sense of balance, the gap between the wheelchair and the article to which the patient is to be moved presents another challenge in that the patient may not be able to reach across the gap. A loss of balance while the patient is traversing the gap could be disastrous, if a lone caregiver does not posses sufficient strength to steady the patient.

Thus, there exists a need in the art for a wheelchair possessing the capability to raise the patient above the level of the article to which the patient may be transferred. Also, there exists a need in the art for a wheelchair capable of being lowering to a level that is less than that of the article from which the patient may be transferred. Additionally, there exists a need in the art for a wheelchair that provides the patient with the ability to steady and maintain their balance when transferring into and out of the wheelchair. Finally, there exists a need in the art for a wheelchair that provides resistance from tipping over when the patient transfers into and out of the wheelchair.

BRIEF SUMMARY OF THE INVENTION

The present invention specifically addresses and alleviates the above referenced deficiencies associated with wheelchairs. More particularly, the present invention is a uniquely configured wheelchair specifically adapted for transferring a patient into and out of the wheelchair by providing a combination of a selectively movable seat base with at least one security beam disposed on the wheelchair. The seat base is configured for selectively raising or lowering a patient between a first level and a second level such that the patient may be initially placed at a higher level than the article to which they are to be transferred. The patient then grabs the security beam for stability and balance and simultaneously moves downward and laterally to perform the transfer. In this manner, the force of gravity may be utilized to advantage so that the patient, either acting alone or with assistance, may easily transfer from the wheelchair to another location such as a living room chair or sofa, bathroom facilities or the passenger seat of an automobile, with the aid of no more than a single caregiver.

The wheelchair is comprised of a support frame to which is attached at least two main wheels, a seat base and at least one security beam. Additional components may include a pair of transit wheels, a pair of arm rests, a seat back and a head rest. As was mentioned above, the seat base is configured for selectively raising and lowering the patient between the first level and the second level as may be facilitated through various lifting mechanisms. The wheelchair may comprise a pair of anti-tip booms to prevent tipping during use of the security beams in patient transfers, as will be discussed in detail below.

A pair of transit wheels may be provided. The transit wheels may be mounted to the support frame and configured to be freely swivelable, providing lateral and forward/aft stability as well as steering capability to the wheelchair during normal operation. In comparison, the anti-tip booms provide lateral and forward/aft stability to prevent tipping of the wheelchair when the patient's weight is placed on the security beams during transfers into and out of the wheelchair. Thus, the distance between the main wheels and the respective ends of the anti-tip booms is fairly long as compared to the relatively short distance between the main wheels and the transit wheels.

The support frame has a front, a rear, and opposing sides with the front facing in a forward direction and the rear facing in an aft direction. The opposing sides of the support frame face in opposing lateral directions. The main wheels are mounted on the support frame and may be mounted on either side of the support frame. The seat base is disposed upon the support frame between the main wheels and is configured for selectively raising and lowering the patient between the first level and the second level. The lifting mechanism may comprise a scissors jack, a pneumatic or hydraulic jack or any number of alternative devices. The lifting mechanism may be configured for lowering the seat base to the first level such that the patient may be lifted off of the floor with the aid of the security beams. In such a scenario, the security beams may be horizontally oriented and slipped under the armpits of the patient in order to lift the patient up to a height sufficient for transfer into the wheelchair or into an adjacently located article of furniture.

The security beams may be substantially horizontally orientated and may project outwardly in the forward direction. The wheelchair may include only a single security beam or the pair of security beams disposed adjacent each of the main wheels. The security beams may alternatively have a substantially vertical orientation. The security beams may be of a length such that they extend sufficiently past the wheelchair such that the patient sitting on an adjacent article of furniture may easily grasp the security beam prior to transferring into the wheelchair. The security beams may be axially extendable, such as by means of a telescoping configuration, such that the overall length may be adjusted beyond an initial length. The security beam may be configured to be pivoted and locked into any position intermediate the substantially vertical orientation and the substantially horizontal orientation.

If a seat back and head rest are included with the wheelchair, the seat back may be reclinable and pivotable between any positions intermediate a generally upright and a reclined position. The head rest, normally disposed above the seat back, may be configured to be detachable from the seat back such that it may be removed. A pair of arm rests may be included, the arm rests projecting in the lateral direction and disposed above each side of the seat base. The arm rests may be temporarily pivoted out of the way or they may be altogether removed from the seat back to further facilitate the patient transfer. The wheelchair may include the anti-tip booms disposed on either side of the support frame and they may be horizontally oriented and projecting in the forward direction.

The anti-tip booms may be extended in the forward direction in order to provide stability for the wheelchair against tipping such as when the weight of the patient is placed upon the security beam. The anti-tip booms may be configured to project into one of the opposing lateral directions in order to prevent tipping of the wheelchair when the patient is transferring into and out of the side of the wheelchair. The anti-tip booms may include caster wheels mounted on the end of the anti-tip booms that are held a few inches above the floor when the anti-tip booms are retracted but are placed into contact with the floor once the anti-tip booms are extended.

In operation, the wheelchair functions as a conventional wheelchair once the patient is seated therein. However, the wheelchair advantageously includes the additional combined features of the selectively moveable seat base and the security beams for allowing the patient to transfer from an article of furniture to the wheelchair, or vice versa, utilizing the force of gravity. For example, during a transfer of the patient from a bed to the wheelchair, the wheelchair is moved adjacent the bed. The security beam is disposed in a horizontal orientation and axially extended in order that the patient may conveniently grasp the security beam prior to the transfer. The patient can then use the security beams as a portable banister or hand rail to enable use of the patient's hand, arm and upper-torso muscles.

The patient is then laterally moved toward the seat base while the force of gravity acts to simultaneously pull the patient down toward the seat base. If unable to move laterally under their own power, the patient may be assisted. The anti-tip booms may be extended to any length and may be pivoted into the forward-facing or lateral-facing directions in order to provide stability against tipping of the wheelchair as may otherwise occur during application of the patient's weight upon the security beam. The patient can then be wheeled about under their own power or with assistance in the conventional manner. Transfer of the patient out of the wheelchair and into an article of furniture, such as a living room chair, is accomplished in the reverse order as that described above for transfer of the patient into the wheelchair.

BRIEF DESCRIPTION OF THE DRAWINGS

These as well as other features of the present invention will become more apparent upon reference to the drawings wherein.

DETAILED DESCRIPTION OF THE INVENTION

Figure 1:
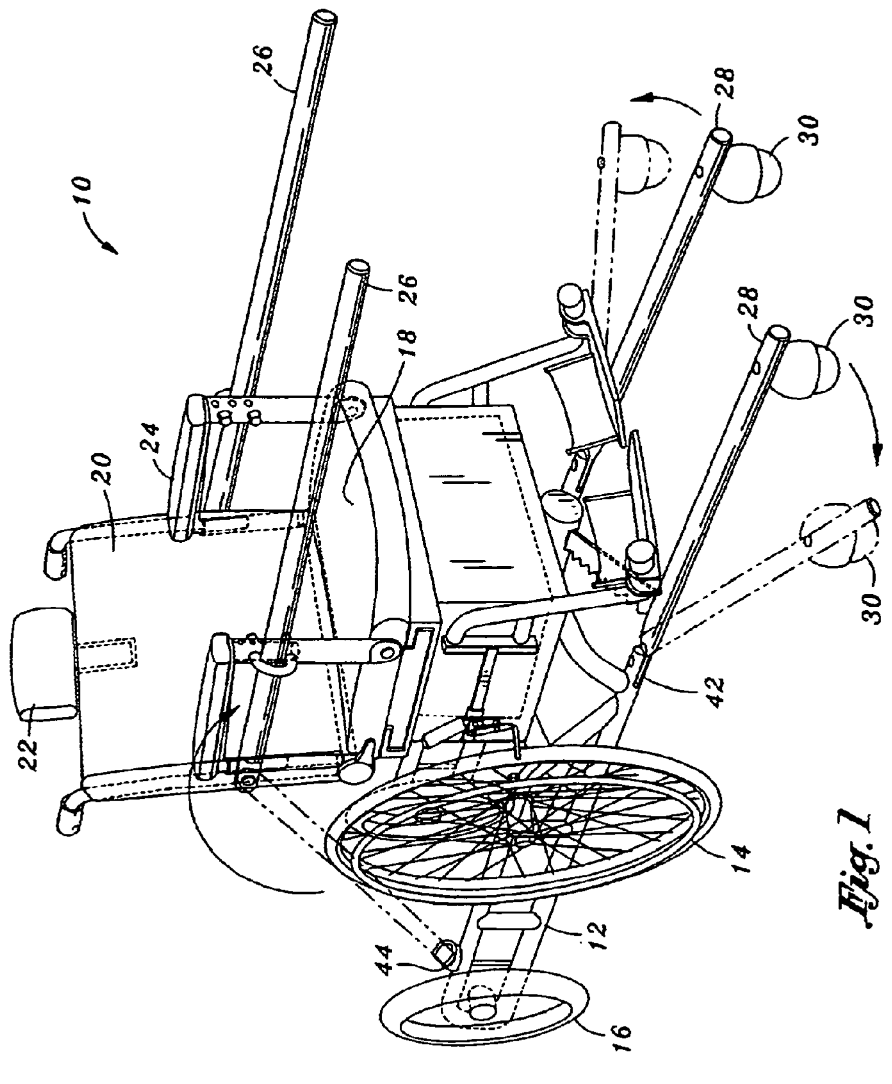
FIG. 1 is a perspective view of a wheelchair of the present invention illustrating the arrangement of a pair of security beams and a pair of anti-tip booms disposed adjacent a pair of main wheels.

Referring now to the drawings wherein the showings are for purposes of illustrating preferred embodiments of the present invention and not for purposes of limiting the same, FIG. 1 is a perspective view of a wheelchair 10 of the present invention. The wheelchair 10 is comprised of a support frame 12 to which is attached at least two main wheels 14, a seat base 18 and at least one security beam 26. The wheelchair 10 shown in FIG. 1 comprises additional components including a pair of transit wheels 16, a pair of arm rests 24, a seat back 20 and a head rest 22. The seat base 18 is configured for selectively raising or lowering a patient between a first level 54 and a second level 56. Such selective raising and lowering may be accomplished through a lifting mechanism 32, as can be seen in FIG. 2 and in FIGS. 10 and 11.

Advantageously, as will be discussed in greater detail below, the combination of the movable seat base 18 with the at least one security beam 26 allows a patient to transfer from an article of furniture to the wheelchair 10 utilizing the force of gravity so that the patient is simultaneously moving downward and laterally while holding on to the security beam 26 during the transfer to the wheelchair 10. For example, during a transfer of the patient from a bed to the wheelchair 10, the seat base 18 is moved to the first level 54 that is at a lower level than that of the bed so that the patient is transferred to the seat base 18 in a downward motion. The patient may hold onto the security beam 26 which extends outwardly from the wheelchair 10 so that the patient may steady themselves during the transfer.

Alternately, the patient may transfer from the wheelchair 10 to a living room chair wherein the seat base 18 is moved to the second level 56 that is at a higher level than that of the living room chair. Again, gravity is utilized such that the patient is moving downward into the living room chair while the patient holds onto the security beam 26 during the transfer for additional stability. Only the application of a lateral force need be provided to perform each transfer. The lateral force may be applied solely by the patient or with assistance, such as by a caregiver. A flexible plastic sheet may be extended between the wheelchair 10 and the article of furniture so that the patient may slide across the gap therebetween. Additionally, the wheelchair 10 of the present invention may comprise a pair of anti-tip booms 28 to prevent tipping during use of the security beams 26 in patient transfers, as will be discussed in detail below.

Figure 2:
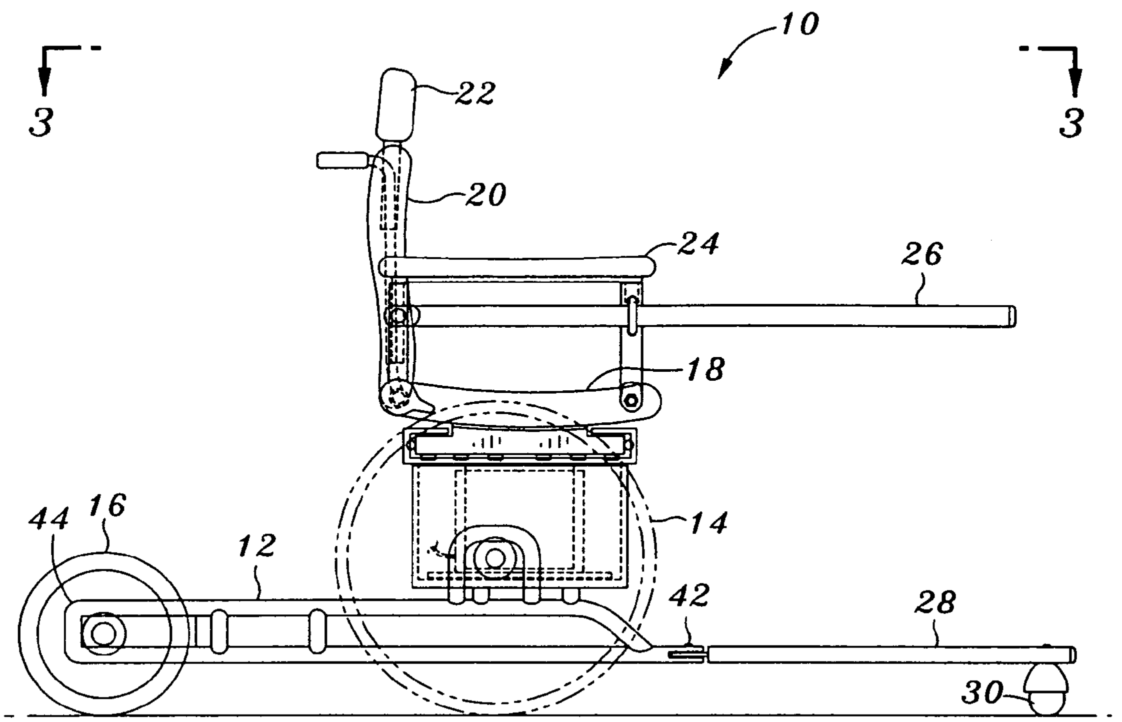
FIG. 2 is a side elevational view of the wheelchair illustrating the security beams disposed in a horizontal orientation.
Figure 11:
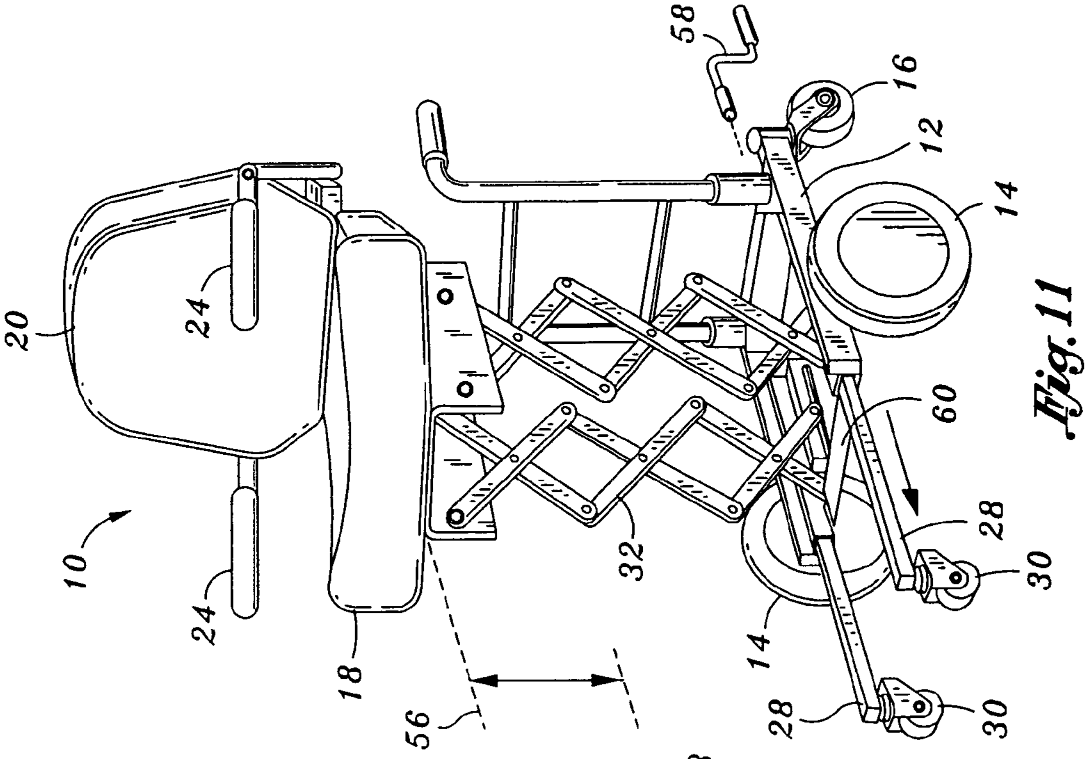
FIG. 11 is a perspective view of the wheelchair illustrating the seat base raised to the second level and illustrating the lifting mechanism configured as a scissors jack.
Figure 10:
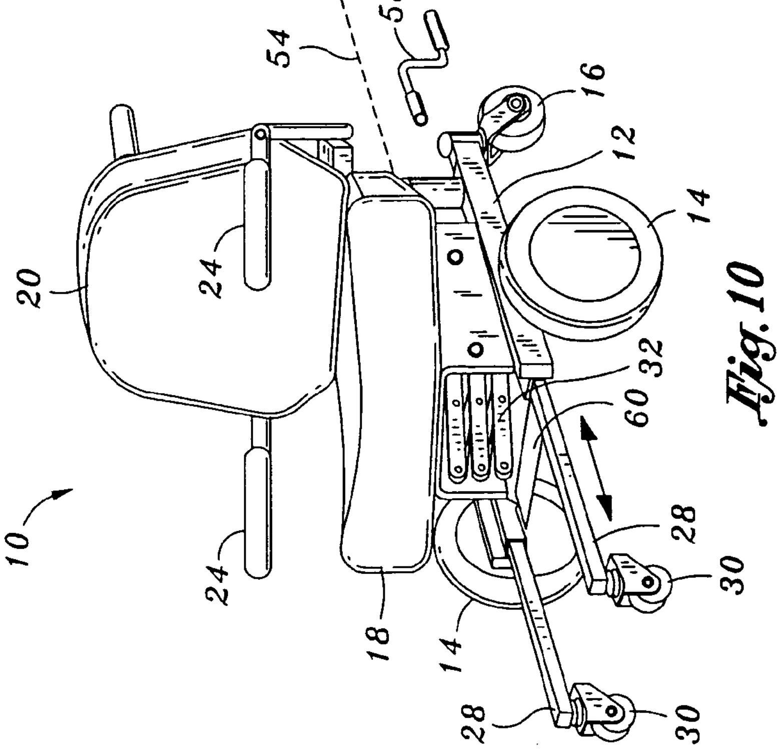
FIG. 10 is a perspective view of the wheelchair with small-diameter main wheels and illustrating the seat base lowered to a first level.

Referring now more particularly to FIGS. 1 and 2, the wheelchair 10 may include the pair of transit wheels 16, although a single transit wheel 16 may be provided. Generally smaller in diameter than the main wheels 14, the transit wheels 16 are typical of conventional wheelchairs and may be mounted to the support frame 12 such that they are free to swivel or caster about an angle perpendicular to the axis of rotation of the transit wheels 16. Alternatively, the wheelchair 10 may include relatively small diameter main wheels 14 as can be seen in FIGS. 10 and 11 such that the turning radius of the wheelchair 10 is relatively tight. Such a tight turning radius may allow a caregiver to maneuver the wheelchair 10 around obstacles and through doorways in the confined spaces of a home.

Referring back now to FIGS. 1 and 2, the transit wheels 16 may be mounted on the support frame 12 aft of the main wheels 14. Alternately, the transit wheels 16 may be mounted forward of the main wheels 14, as is the case for conventional wheelchairs. The transit wheels 16 provide lateral and forward/aft stability to the wheelchair 10 during normal operation thereof. The transit wheels 16 may also provide steering or directional control to the wheelchair 10. The anti-tip booms 28 provide lateral and forward/aft stability to the wheelchair 10 when the patient is being transferred into or out of the wheelchair 10, as will be discussed in more detail below. It should be noted that the distance in the direction of travel from the main wheels 14 to respective ends of the anti-tip booms 28 is fairly long as compared to the relatively short distance from the main wheels 14 to the transit wheels 16.

Figure 3:
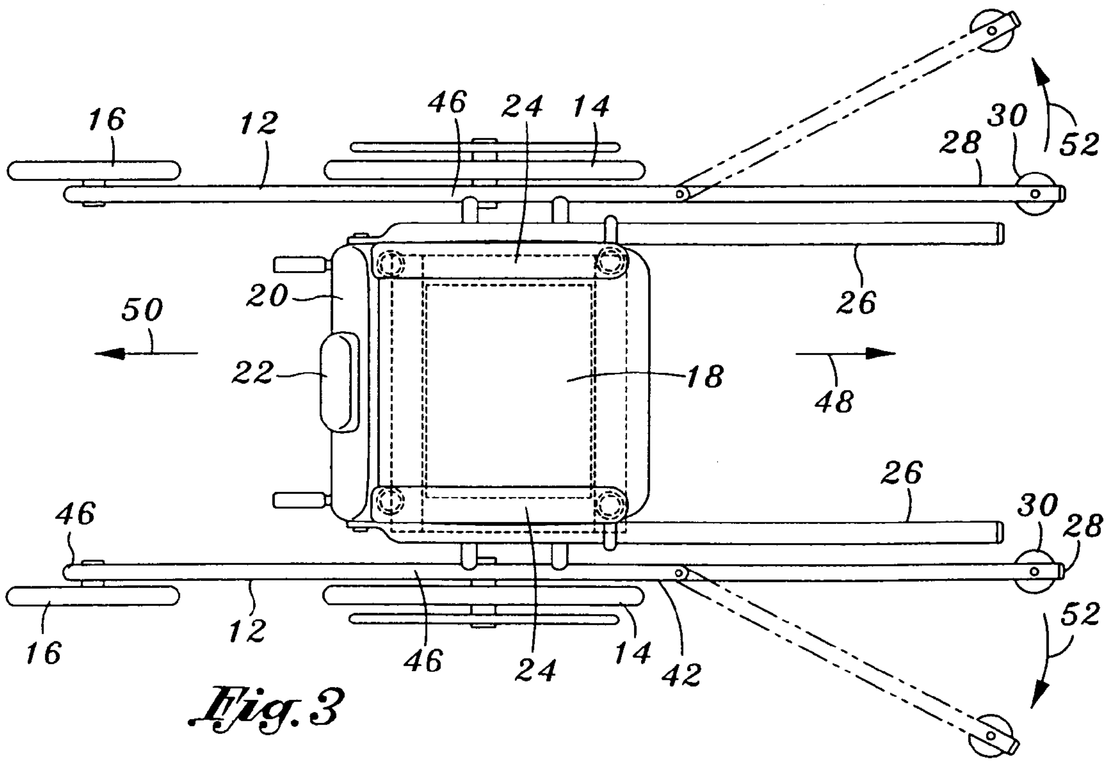
FIG. 3 is a plan view of the wheelchair taken along line 3—3 of FIG. 2 illustrating the anti-tip booms disposed in laterally outward orientations.

Turning now to FIG. 3, shown is plan view of the wheelchair 10 taken along line 3—3 of FIG. 2 illustrating the seat base 18 disposed between the main wheels 14. The support frame 12 has a front, a rear 44, and opposing sides 46 with the front facing in a forward direction 48 and the rear 44 facing in an aft direction 50. The opposing sides 46 of the support frame 12 face in opposing lateral directions 52. The main wheels 14 are mounted on the support frame 12 and may be mounted on either side 46 of the support frame 12 as shown in FIG. 1. The main wheels 14 may be mounted coaxially although the main wheels 14 may be staggered wherein one of the main wheels 14 is disposed forward of the other main wheel. It contemplated that there are many other configurations for mounting the main wheels 14. For example, a main wheel 14 may be mounted inboard of a respective side 46 of the support frame 12 such that the support frame 12 extends laterally past the main wheel 14.

Furthermore, it is contemplated that the wheelchair 10 may be configured such that a single main wheel 14 is combined with a pair of transit wheels 16 in a tricycle arrangement. In such a configuration, the single main wheel 14 may be generally disposed in front of the seat base 18 and generally in the center of the support frame 12 between the opposing sides 46. The main wheels 14 may be of a relatively small diameter of about 10 inches such that the turning radius of the wheelchair 10 is relatively tight. Such a tight turning radius may allow a caregiver to maneuver the wheelchair 10 around obstacles. Patient transfer may also be enhanced by providing relatively small diameter main wheels 14 that have an overall height that is significantly less than the normal height of the seat base 18. The main wheels 14 may be of pneumatic construction in order to provide shock absorbing characteristics, quiet operation, and ease of rolling on rough terrain for the wheelchair 10.

The support frame 12 may be fabricated of tubing that is interconnected via any number of well-known means such as welding and the like. The tubing may have a circular cross-section but may be configured with any number of cross-sectional geometries. Optionally, the support frame 12 may be fabricated of plate stock or it may be of monocoque construction. The support frame 12 may be of metallic construction such as aluminum or steel. However, any number of materials may be utilized for forming the support frame 12 such as graphite/epoxy, fiberglass, or polymeric material such as polyethylene.

Turning now to FIGS. 2 and 3, as can be seen, the seat base 18 is disposed upon the support frame 12 between the main wheels 14. The seat base 18 may be biased such that a majority of the patient's weight is directed over the main wheels 14, as can be seen if FIGS. 10 and 11. However, in the configuration described above wherein a respective main wheel 14 may be mounted between a side 46 and the midpoint of the support frame 12, each side 46 of the seat base 18 may extend along the width of the support frame 12 so that each side 46 of the seat base 18 extends past the main wheel 14. As was mentioned above, the seat base 18 may be configured for selectively raising and lowering a patient between the first level 54 and the second level 56. FIG. 2 is a side elevational view of the wheelchair 10 illustrating the seat base 18 raised to the second level 56. As can be seen, the wheelchair 10 includes a lifting mechanism 32 configured for selectively raising and lowering the seat base 18. The lifting mechanism 32 may comprise a scissors jack having linkages, the horizontal diagonals thereof being alternately lengthened and shortened by a horizontally-driven crank 58 in order to selectively raise and lower the seat base 18, as can be seen if FIGS. 10 and 11.

Optionally, the lifting mechanism 32 may comprise a pneumatic or hydraulic jack wherein compressed air or hydraulic fluid, respectively, may be alternately driven into and exhausted out of an actuator cylinder interposed between the support frame 12 and the seat base 18 in order to raise and lower the seat base 18. However, it will be recognized that the lifting mechanism 32 may be comprised of a number of alternative devices, any of which may be utilized for selectively raising and lowering the seat base 18. The lifting mechanism 32 may be configured for lowering the seat base 18 to the first level 54 such that the patient may be lifted off of the floor with the aid of the security beams 26. In such a scenario, it is contemplated that the security beams 26 may be horizontally oriented and slipped under the armpits of the patient. In this regard, the wheelchair 10 acts as a jack to lift the patient up to a height sufficient for transfer into the wheelchair 10 or into an adjacent article of furniture.

Figure 5:
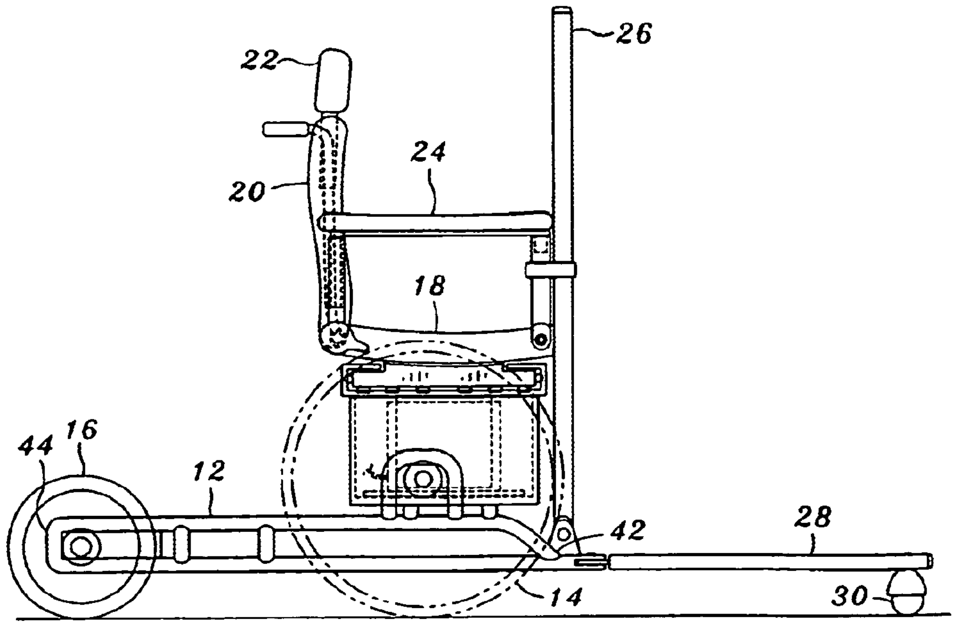
FIG. 5 is a side elevational view of the wheelchair illustrating the security beams being disposed in a vertical orientation.

Turning briefly now to FIG. 5, shown is a side elevational view of the seat base 18 illustrating a sliding mechanism for translating the seat base 18 in the lateral direction 52. The seat base 18 may be configured to be relatively wide such that the seat base 18 extends over the wheels when the seat base 18 is moved laterally. Such a wide seat base 18 may help to bridge the gap between articles of furniture and the like. In this regard, the relatively wide seat base 18 may simplify patient transfers. The seat base 18 may be configured to be selectively translatable in the lateral direction 52 wherein the seat base 18 may be slidably mounted upon the support frame 12. In a preferred embodiment, the seat base 18 is configured to translate six inches in a lateral direction 52 from a neutral or central position. Additionally, the seat base 18 may also be configured to translate six inches in an opposite lateral direction 52. However, it will be recognized that the seat base 18 may be configured to translate over any distance in either of the opposing lateral directions 52.

A locking feature may be incorporated into the wheelchair 10 to selectively lock the seat base 18 into a neutral or centered position. The locking mechanism may also be utilized to lock the seat base 18 into either one of the lateral positions, including any intermediate position, in order to restrict lateral movement of the seat base 18 during a transfer operation. Also, the seat base 18 may be configured to be pivotable about a vertical axis to aid in the transfer of the patient into and out of the wheelchair 10. The pivot point may be located generally near a center position of the seat base 18. However, the seat base 18 may be configured to be pivotable about any point on the wheelchair 10, such as near a corner of the seat base 18 perimeter.

Referring back to FIG. 1, shown is the pair of security beams 26 having substantially horizontal orientations and projecting outwardly in the forward direction 48 although it is contemplated that only the single security beam 26 may be provided with the wheelchair 10. As can be seen, a security beam 26 is disposed adjacent each of the main wheels 14. The security beams 26 may have a substantially vertical orientation. As was earlier mentioned, the security beams 26 are configured as hand holds for the patient when transferring onto and off of the seat base 18. In this regard, it is contemplated that the security beams 26 may be configured as an elongate member of cylindrical cross-section, at least in the area where the patient may hold onto the security beam. In consideration of the desire to provide a hand hold that may be easily grasped by the human hand, a diameter of one to one and one-half inches may be a preferred size for the security beam 26.

A preferred length of the security beams 26 may be forty inches in order to provide a length sufficiently extending past the wheelchair 10 such that a patient sitting on an adjacent article of furniture may easily grasp the security beam 26 prior to transferring into the wheelchair 10. However, it is contemplated that there are many shapes, sized and configurations for the security beam 26 that may be workable. Shown in FIGS. 1 and 2 as being disposed adjacent the arm rests 24, the security beams 26 may be connected thereto by any conventional means such as with fittings and mechanical fasteners. The security beams 26 may also be connected to the support frame 12 via vertical members that place the security beam 26 at approximately the same height as the arm rests 24. Furthermore, the security beam 26 may be configured to be selectively raised and lowered either independently, or in conjunction with the seat base 18, as an additional feature which may increase the flexibility of the manner in which the patient transfer may be performed. The security beams 26 may be attached to arm rests 24 that may be included with the wheelchair 10.

The security beams 26 may be configured to be axially extendable such that the overall length of the security beams 26 may be extended beyond an initial length. In this regard, the security beams 26 may be comprised of slidable, coaxial sleeves configured to telescope outwardly. The sleeves may be manually extended outwardly to a desired length. A locking collar may be provided at the end of each sleeve to lock the individual sleeves in position once the security beam 26 is extended to the desired position. The security beam 26 may be configured to be pivotable between the substantially vertical orientation and the substantially horizontal orientation and may be completely detachable from the wheelchair 10. The security beams 26 may be locked in either of the orientations by means of locking pins.

As can be seen in FIGS. 1–9, each one of the security beams 26 may be configured as an elongate member wherein the security beams 26 each define a longitudinal axis A extending therethrough. Furthermore, the security beams 26 may be configured to be pivotable about a pivot point 64 or pivot axis B. As can be seen in each of the embodiments shown in FIGS. 1–9, the longitudinal axis A of the security beam 26 passes through the pivot point 64. The pivot point 64 defines the location of the pivot axis B about which the security beams 26 are pivotable. The security beams 26 may be connected to the support frame 12 at the pivot point 64. The security beams 26 may additionally be connected to the support frame 12 by a releasable attachment mechanism 66 located at a spaced distance from the pivot point 64. The wheelchair 10 is configured such that disconnection of the releasable attachment mechanism 66 allows a user to pivot the security beam 26 about the pivot axis B into any orientation between a substantially horizontal and a substantial vertical orientation, and vice versa.

For example, as is shown in FIGS. 1–2, each one of the security beams 26 may be attached to the support frame 12 at the front 42 and rear 44 thereof. More specifically, the pivot point 64 for the security beam 26 may be located at the rear 44 of the support frame 12 underneath the arm rest 24 and adjacent to one of the main wheels 14. The releasable attachment mechanism 66 may be attached to the front 42 of the support frame 12 underneath the arm rest 24 adjacent to one of the main wheels 14. The security beams 26 may be pivotable about the pivot axis B by first releasing the releasable attachment mechanism 66 and then pivoting the security beam 26 about the pivot axis B to the desired orientation. The pivot point 64 may also be located at a position above one of the main wheels 14 and/or at a rear of one of the arm rests 24

Figure 4:
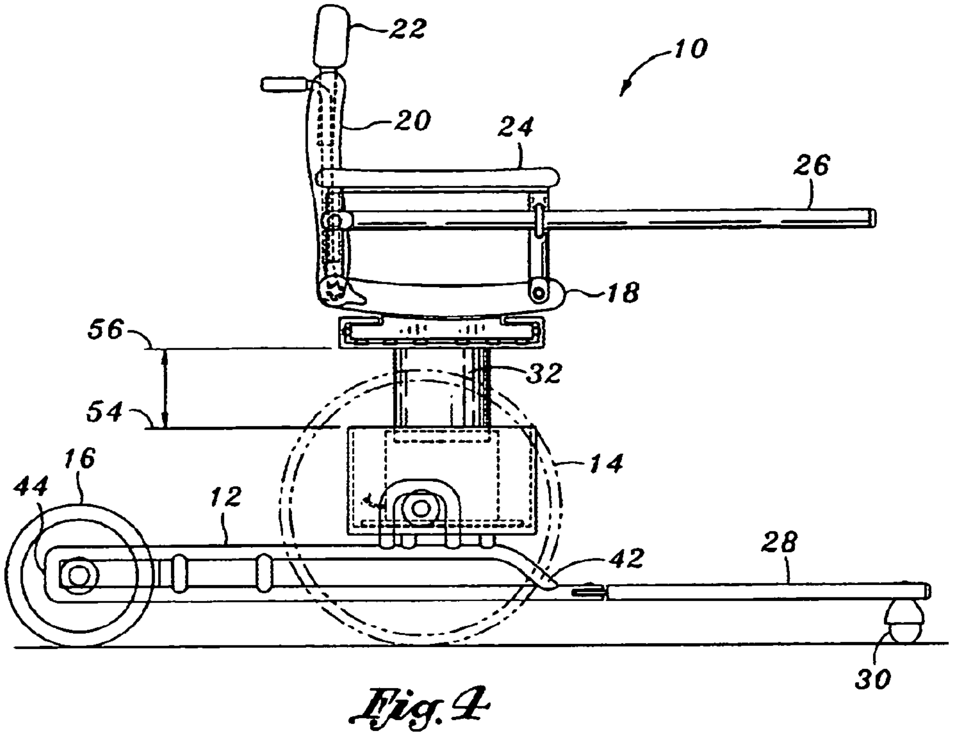
FIG. 4 is plan view of the wheelchair illustrating the security beams projecting outwardly in a horizontal orientation with the seat base of the wheelchair being raised to a second level.
Figure 4A:
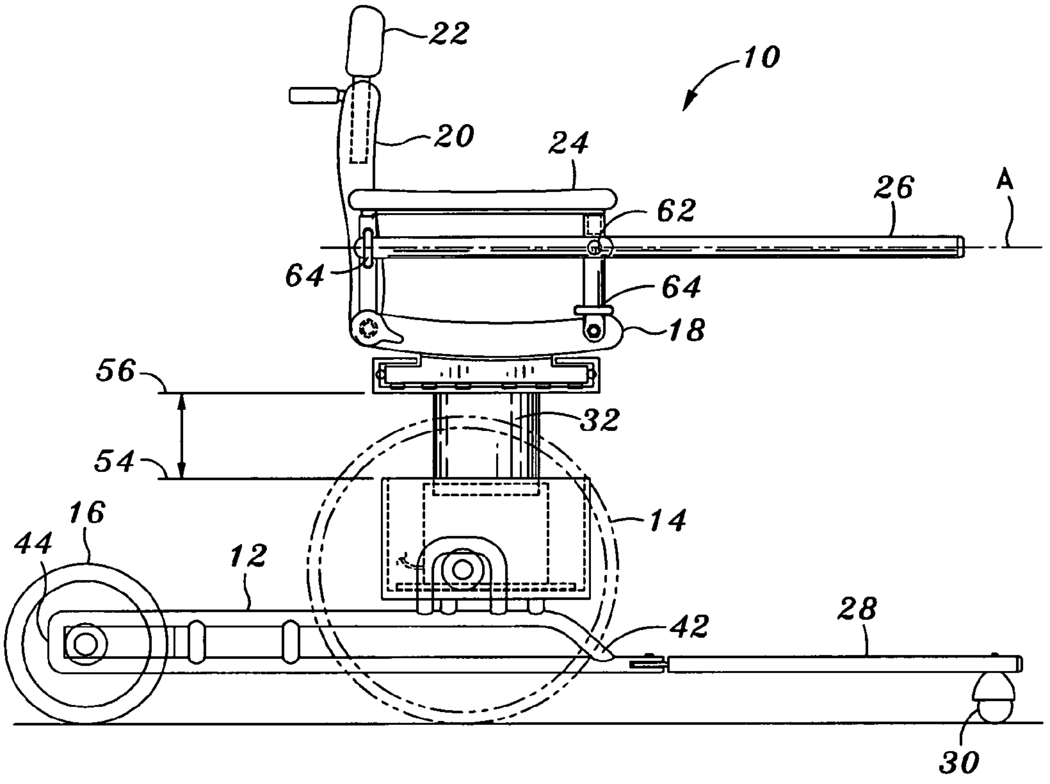
Figure 6:
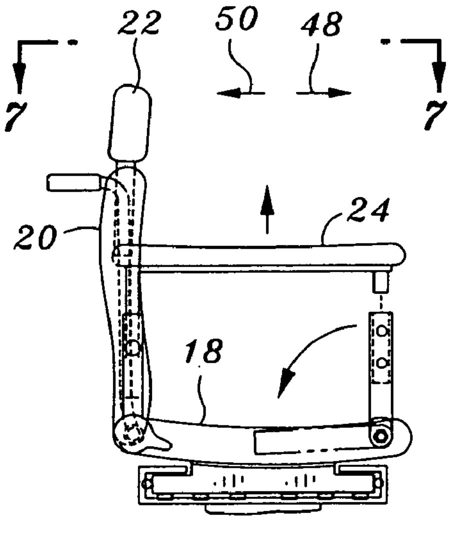
FIG. 6 is a partial side elevational view of the wheelchair illustrating arm rests of the wheelchair being raised upwardly such that they may be pivoted laterally outwardly.

It should be noted that for the embodiments shown, the security beams 26 may be configured to be moveable or pivotable independent of any pivoting or movement of the arm rests 24. More specifically, FIG. 4 illustrates the wheelchair 10 having the pair of arm rests 24 projecting in the lateral direction 52. A respective one of the arms rests 24 may be disposed above each side 46 of the seat base 18. However, the arm rests 24 may be configured to be horizontally pivotable. In this regard, it is contemplated that the security beam 26 is configured to be moveable separate from any movement or positioning of the arm rests 24. For example, the security beams 26 may be pivoted from the horizontal orientation shown in FIG. 4*a* to a vertical orientation while the arm rests 24 remain stationary.

Although each security beam 26 is shown as having a single releasable attachment mechanism 66, it is contemplated that a plurality of releasable attachment mechanisms 66 may be provided for each security beam 26. For example with reference to FIG. 1, the wheelchair 10 includes a releasable attachment mechanism 66 located at the rear of the arm rest 24 and a releasable attachment mechanism 66 located adjacent a forward edge of the seat base 18 allowing selective orientation of the security beam 26 in the vertical orientation or horizontal orientation. In this regard, it is contemplated that any number of releasable attachment mechanisms 66 may be located anywhere on the support frame 12 such that the security beam 26 may be held in any orientation intermediate the vertical and the horizontal orientations. In this regard, it is contemplated that the wheelchair 10 may include several releasable attachment mechanisms 66 located at different locations on the wheelchair 10.

The releasable attachment mechanism 66 may be configured as a C-shaped bracket as shown in FIG. 4. In addition, the releasable attachment mechanism 66 may be configured as a strap member as shown in FIG. 5. However, it is contemplated that the releasable attachment mechanism 66 may be configured in any configuration suitable for securely attaching the security beam 26 to the wheelchair 10. For example, the releasable attachment mechanism 66 may be configured as one or several screw members that are extended through one or several corresponding holes formed in the security beam 26. The screw members may be configured to be threadably engaged to threaded holes strategically located on the support frame 12.

Referring to FIG. 4, shown is a plan view of the wheelchair 10 illustrating the pair of arm rests 24 projecting in the lateral direction 52. As was mentioned above, the arm rests 24 may be configured to be horizontally pivotable. A respective one of the arms rests 24 may be disposed above each side 46 of the seat base 18. A clevis and pin arrangement may be included between a respective one of the arm rests 24 and the seat back 20 at the intersection thereof to provide the pivoting feature of the arm rests 24. In the scenario described above wherein the head rest 22 may be temporarily removed from the reclined seat back 20 to facilitate washing of the patient's hair in a washing basin, the arm rest 24 may also be temporarily pivoted out of the way or altogether removed from the seat back 20 to further facilitate such an activity. It is contemplated that the seat back 20 itself may be removable to reduce the overall height of the wheelchair 10 in order to make it more convenient to transport. In this regard, the seat base 18 itself may further be configured to be removable from the wheelchair 10 in order to provide an additional measure of compactness.

Referring briefly now to FIGS. 2 and 3, shown is a plan view of the wheelchair 10 illustrating the anti-tip booms 28 being substantially horizontally disposed and projecting in the forward direction 48 adjacent the main wheels 14. As was mentioned earlier, the anti-tip booms 28, when extended in the forward direction 48, provide stability for the wheelchair 10 in the forward direction 48 against tipping such as when the patient places their weight upon the security beam. Such additional stability may be required beyond that which is provided by the combination of the main wheels 14 with the transit wheels 16. The anti-tip booms 28 may be configured to react any downward force that is placed thereupon by the patient. In order to provide additional stability for the wheelchair 10 in the lateral direction 52, a respective one of the anti-tip booms 28 may be configured to project in one of the opposing lateral directions 52. Such an orientation of the anti-tip booms 28 may be desirable when the patient is transferring into and out of the side 46 of the wheelchair 10.

The lateral orientation of the anti-tip booms 28 may further be desirable when the seat base 18 is translated laterally or pivoted and the arm rests 24 are also pivoted or removed for simplifying the transfer of the patient into and out of the side 46 of the wheelchair 10. The anti-tip booms 28 may be configured to be pivotable and locked into any position that is intermediate the forward-projecting orientation and the laterally-projecting orientation. Similar to the above-described telescoping arrangement of the security beams 26, the anti-tip booms 28 may be likewise comprised of telescoping, coaxial sleeves that may be manually extended to a desired length and locked into place via pins or a locking collar. The anti-tip booms 28 may include caster wheels 30, skids, suction cups and the like on the extreme end of each anti-tip boom 28. However, any number of devices may be incorporated into the respective ends of the anti-tip booms 28. The anti-tip booms 28 may be configured such that the caster wheels 30, skids, or alternative devices mounted on the end of the anti-tip booms 28 are fixed a few inches above the floor when the anti-tip booms 28 are retracted, but are placed in contacting relation with the floor once the anti-tip booms 28 are extended.

Figure 7:
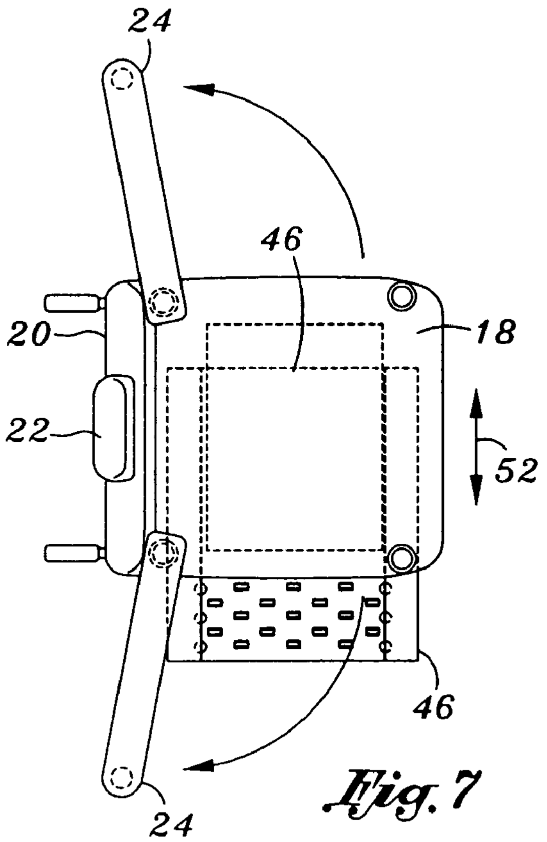
FIG. 7 is a partial plan view of the wheelchair illustrating the seat base being disposed laterally over a main wheel with the arm rests being disposed in an outwardly pivoted orientation.
Figure 8:
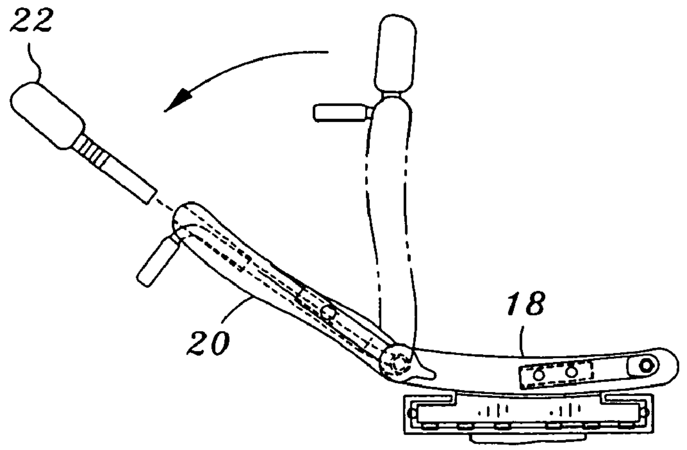
FIG. 8 is a partial side elevational view of the wheelchair illustrating a seat back of the wheelchair being pivoted into a reclining orientation.
Figure 9:
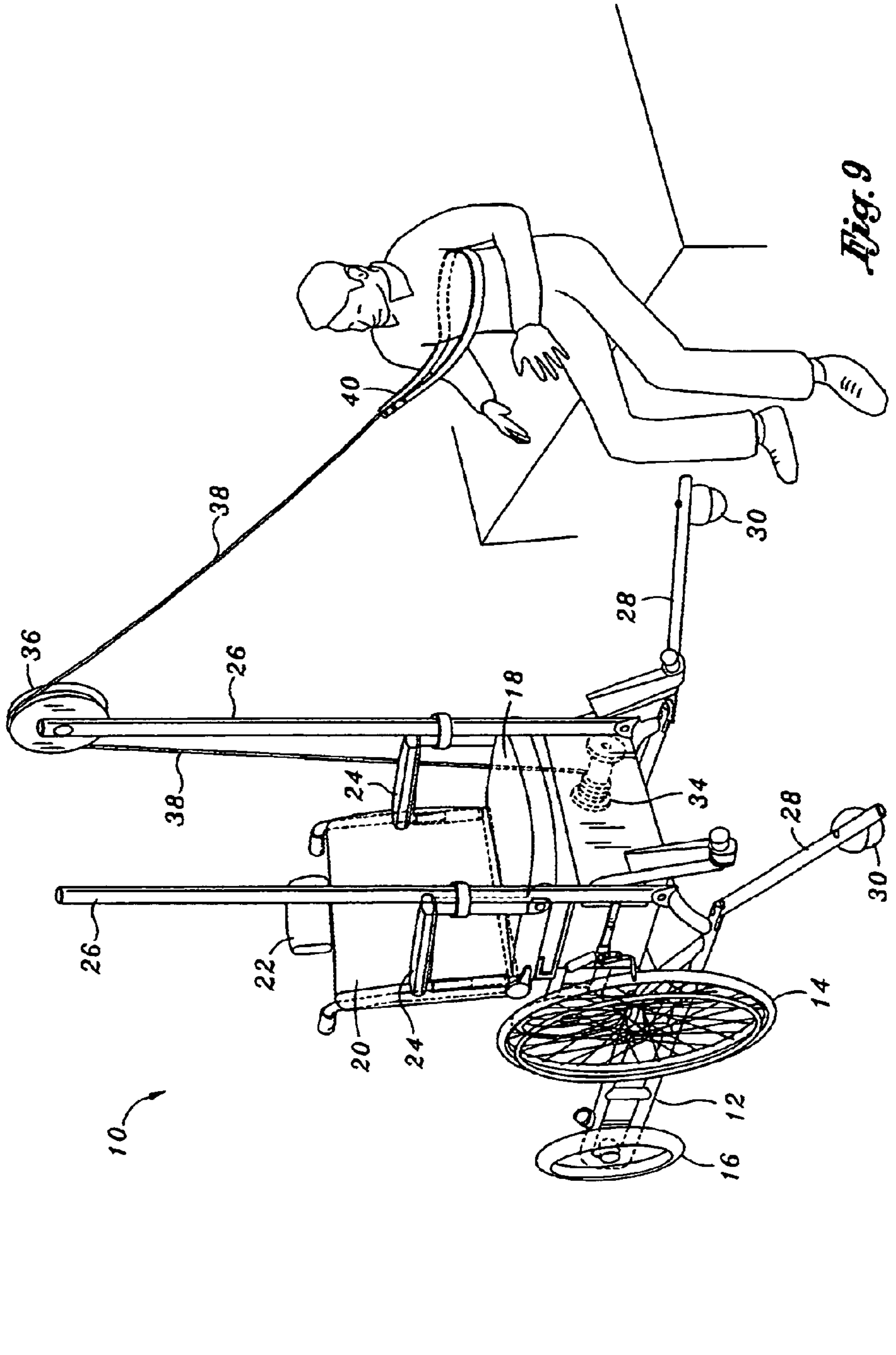
FIG. 9 is a perspective view of the wheelchair illustrating a winch motor, a winch pulley mounted on the security beam, and a winch cable connected to a patient via a body harness for raising and lowering the patient.

Referring now to FIG. 7, shown is a perspective view of the wheelchair 10 further comprising a winch motor 34 and a winch pulley 36 mounted on the vertically-disposed security beam 26. A winch cable 38 may be connected to the patient via a shoulder harness or a body harness 40. Rotation of the winch motor 34 causes the winch cable 38 to alternately raise and lower the patient. The winch pulley 36, although shown as being disposed on an end of the security beam, may be configured to be removable therefrom. Also, the winch pulley 36 may be disposed anywhere along a length of the security beam 26 although shown in FIG. 7 as being disposed on an end thereof. The shoulder or body harness 40 may be padded in order to provide cushioning to the patient. The patient may be raised or lowered by operating the winch motor 34 to alternately retract or extend the winch cable 38. It is contemplated that the winch motor 34 may be utilized to raise the patient, such as from a supine position on a bed, to a sitting position, prior to initiation of the transfer of the patient from the bed to the wheelchair 10.

It is contemplated that the winch motor 34 may be electrically powered such as by a battery, which may be disposed on the support frame 12 under the seat base 18.

In this regard, it is further contemplated that the wheelchair 10 may further comprise a motor mounted on the support frame 12. The motor may be configured for driving the main wheels 14 in order to propel the wheelchair 10. Additionally, the motor may be configured for raising and lowering the seat base 18. Other features that may be powered by the motor include the reclining of the seat back 20, pivoting of the arm rests 24 and anti-tip booms 28, and axial extension of the anti-tip booms 28. The pivoting and the axial extension of the security beams 26 may also be actuated by the motor wherein the power may be provided by the battery which may be mounted adjacent the motor on the support frame 12 so as to maintain a low center of gravity. Additionally, the seat base 18, seat back 20, arm rests 24 and head rest 22 may be combined into a single powered seating unit similar to powered seats utilized in many automobiles.

Referring now to FIGS. 10 and 11, shown is the wheelchair 10 with main wheels 14 that are of a smaller diameter than that illustrated in FIGS. 1 through 8. As was mentioned above, the smaller diameter main wheels 14 provide a tighter turning radius to allow a caregiver to more easily maneuver the wheelchair 10 around obstacles and through doorways in the confined spaces of a home. Patient transfers may also be enhanced by providing relatively small diameter wheels that have an overall height that is significantly less than the normal height of the seat base 18 such that the seat base 18 may be laterally extended over the wheels in order to minimize the gap between the wheelchair 10 and the article to which the patient is to be transferred. By configuring the wheelchair 10 with a relatively wide seat base 18, the seat base 18 may be moved closer to the article of furniture, thus reducing the gap therebetween. A flexible plastic sheet may be utilized to assist the caregiver in transferring the patient across the gap such that the patient will not accidentally fall between the gap, as will be discussed in more detail below. As was earlier mentioned, the main wheels 14 may be of pneumatic construction in order to provide shock absorbing characteristics and quiet operation of the wheelchair 10.

In FIG. 10, the wheelchair 10 is shown with the seat base 18 being lowered to the first level 54. In FIG. 11, the seat base 18 is shown being raised to the second level 56. The lifting mechanism 32 illustrated in FIGS. 10 and 11 is a scissors jack configuration operated by the crank 58. The scissors jack has linkages with the horizontal diagonals thereof being alternately lengthened and shortened by rotation of the crank 58 in order to selectively raise and lower the seat base 18 between the first level 54 and second level 56 as well as intermediate levels therebetween. The arm rests 24 and the seat back 20 are configured to move upwardly and downwardly with the seat base 18 so as to allow the patient to steady themselves with the arm rests 24 and security booms during transfers. As can also be seen in FIGS. 10 and 11, the anti-tip booms 28 are may be extended to prevent the wheelchair 10 from tipping over when the weight of the patient is extended over the main wheels 14. Caster wheels 30 may be provided on ends of the anti-tip booms 28 to allow the wheelchair 10 to be maneuvered during transfer operations.

A footrest 60 may be included in the wheelchair 10 of the present invention. One configuration of the footrest 60 may be seen in FIGS. 10 and 11 disposed forward of the scissors jack adjacent the anti-tip booms 28. The footrest 60 may be configured such that the patient may stand on the footrest 60 with the anti-tip booms 28 extended during transfers. The footrest 60 may also be provided in the wheelchair 10 configurations shown in FIGS. 1 through 8. It is contemplated that the wheelchair 10 shown in FIGS. 10 and 11 may also be provided in an electric version wherein the motor for propelling the wheelchair 10 may be mounted under the seat base 18 adjacent batteries in a manner similar to that described above for the wheelchair 10 configurations shown in FIGS. 1 through 8. The security beams 26 may also be provided in the wheelchair 10 of FIGS. 10 and 11, although none are presently shown.

The operation of the wheelchair 10 will now be discussed. Although operable in the conventional manner when transporting a seated occupant, the wheelchair 10 advantageously includes the additional combined features of the selectively moveable seat base 18 with the at least one security beam 26 for transferring the patient into and out of the seat base 18. Importantly, as was mentioned earlier, the present invention allows the patient to transfer from an article of furniture to the wheelchair 10, utilizing the force of gravity so that the patient is moving simultaneously downward and laterally while holding onto the security beam 26 during the transfer to the wheelchair 10. For example, during a transfer of the patient from a bed to the wheelchair 10, the wheelchair 10 is moved adjacent the bed and positioned thereagainst in side-by-side arrangement.

If so equipped, brakes for the main wheels 14 may be engaged to restrict movement thereof. If included, the arm rest 24 nearest the bed may be pivoted from its normal forward facing direction to a lateral direction 52 so that it does not block lateral movement of the patient. The security beam 26 may then be attached to the wheelchair 10 and moved to a vertical orientation. If permanently affixed to the wheelchair 10, the security beam 26 may be axially extended in order that the patient may conveniently grasp the security beam 26 prior to the transfer. Optionally, the security beam 26 may be installed in the horizontal orientation and may be axially extended so that it rests on the bed. The patient can then use the security beam 26 as a portable banister or hand rail to enable use of the patient's hand, arm and upper-torso muscles to aid in the transfer. If a pair of security beams 26 is provided, such security beams 26 may be placed parallel on the bed straddling the seated patient. Such an arrangement of the security beams 26 may enable the patient to walk the hands along the security beams 26 during a transfer. The anti-tip booms 28 may be extended to any length and may be pivoted into the forward facing or lateral directions 52 as required in order to provide stability against tipping of the wheelchair 10 as may otherwise occur during application of the patient's weight upon the security beam 26.

The anti-tip booms 28 act as a brace to prevent the wheelchair 10 from tipping over when weight is placed on the security beams 26 ahead of the chair or to the wheelchair 10 side 46. The seat base 18 may be laterally translated over the main wheels 14 nearer to the bed to decrease the distance over which the patient must be transferred. A flexible plastic sheet may be utilized as a transfer aid to slide the patient across the gap between the wheelchair 10 and the bed. The flexible plastic sheet may also span any differential in height between the wheelchair 10 and the bed. Preferably, the wheelchair 10 may be raised to the second level 56 such that the seat base 18 is higher than the bed. By using a flexible plastic sheet, the patient may then be slid slightly downwardly across the gap on the flexible plastic sheet from the seat base 18 to the bed.

Additionally, if so configured, the seat base 18 may be pivoted to simplify the transfer. The seat base 18 is moved to the first level 54 that is at a lower level than that of the bed so that the patient is transferred from the bed down to the seat base 18. In this regard, a motorized bed that may be raised above the level of the seat base 18 may be advantageously utilized. Furthermore, the motorized bed may be utilized to raise the patient from a prone or supine position, where the patient is laying horizontally on the bed, up to a more upright sitting position. If the patient is unable to move from a supine position to a sitting position, either acting alone or with assistance, the combination of the winch motor 34, winch pulley 36, winch cable 38 and body harness 40 may be employed to lift the patient. The winch motor 34 may be engaged in order to retract the winch cable 38 and thereby raise the patient to a sitting position.

Once in the sitting position, the patient may grab one or both of the security beams 26 to maintain balance and stability during the transfer. If capable, the patient may stand, utilizing the security bars for support. The patient is then laterally moved toward the seat base 18 while the force of gravity acts to simultaneously pull the patient down toward the seat base 18. Here again, the flexible plastic sheet may be utilized to allow the patient to slide across the gap between the wheelchair 10 and the bed. If unable to move laterally under their own power, the patient may be assisted. Once the patient is positioned upon the seat base 18, the body harness 40 may be removed and the winch cable 38 stowed. The anti-tip booms 28 and security beams 26 may be retracted and the arm rest 24 returned to their normal positions. The patient can then be wheeled about in the wheelchair 10 under their own power or with the assistance of a caregiver.

Transfer of the patient out of the wheelchair 10 and into an article of furniture, such as a living room chair, is accomplished in the reverse order as that described above. A typical sequence of operations when transferring a patient out of the wheelchair 10 may start with positioning the wheelchair 10 adjacent the article to which the patient is to be transferred. The main wheels 14 may be locked to prevent movement of the wheelchair 10. The security beams 26 and anti-tip booms 28 may then be oriented in a forward direction 48, laterally or in any intermediate orientation. If so configured, the anti-tip boom 28 may then be extended to the desired length and locked into place. The seat base 18 is raised above the level of the article to which the patient is transferred. Arm rests 24 may be pivoted out of the way or removed. The winch motor 34 may be utilized to assist the patient in rising to a standing position if the patient is incapable of supporting their own weight. The patient is then laterally moved to the article of furniture utilizing the force of gravity to assist in the transfer. After the transfer, the anti-tip booms 28 and security beams 26 may be retracted and the body harness 40 removed.

During the transfer, the patient may grasp the security beam 26 which extends outwardly from the wheelchair 10 so that the patient may steady themselves and maintain their balance. Alternately, the patient may transfer from the wheelchair 10 to a living room chair wherein the seat base 18 is moved to the second level 56 that is at a higher level than that of the article of furniture. Again, gravity is utilized such that the patient is moving downward into the living room chair while the patient holds onto the security beam 26 during the transfer for additional stability. Only the application of a lateral force need be provided to perform each transfer. The lateral force may be applied solely by the patient or with assistance, such as by a caregiver.

As was earlier mentioned, the security beams 26 may also be utilized in raising the patient up off of the floor by slipping the security beams 26 underneath the armpits of the patient. Furthermore, it is contemplated that the wheelchair 10 of the present invention may be utilized to perform patient transfer between many other articles including a shower and an automobile seat.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A wheelchair for transporting a patient, comprising:

a support frame having a front, a rear, and opposing sides, the front and rear facing in respective forward and aft directions, the opposing sides facing in opposing lateral directions;

at least two main wheels mounted on the support frame;

a seat base disposed upon the support frame between the main wheels and configured for selectively raising and lowering the patient between a first level and a second level; and at least one security beam connected to the support frame and being pivotable about a point on the rear thereof and being disposed adjacent one of the main wheels, the security beam being configured as a hand hold for the patient when transferring to and from the wheelchair.

2. The wheelchair of claim 1 wherein the security beam is configured to be selectively raised and lowered.

3. The wheelchair of claim 1 wherein the security beam is axially extendable.

4. The wheelchair of claim 1 wherein the security beam is pivotable between a substantially vertical orientation and a substantially horizontal orientation.

5. The wheelchair of claim 1 further comprising at least one transit wheel mounted on the support frame.

6. The wheelchair of claim 5 wherein the transit wheel is mounted in one of a forward and an aft location relative to the main wheels.

7. The wheelchair of claim 1 further comprising a lifting mechanism configured for selectively raising and lowering the seat base.

8. The wheelchair of claim 7 wherein the lifting mechanism comprises a scissors jack.

9. The wheelchair of claim 7 wherein the lifting mechanism comprises a hydraulic jack.

10. The wheelchair of claim 1 further comprising a reclinable seat back pivotable between generally upright and reclined positions about an aft end of the seat base.

11. The wheelchair of claim 10 further comprising a detachable head rest disposed above the seat back.

12. The wheelchair of claim 1 further comprising a pair of horizontally pivotable arm rests, a respective one of the arm rests being substantially horizontally disposed above each side of the seat base.

13. The wheelchair of claim 1 further comprising a pair of anti-tip booms, a respective one of the anti-tip booms being substantially horizontally disposed and projecting in a forward direction adjacent a main wheel for stabilizing the wheelchair in the forward direction.

14. The wheelchair of claim 1 wherein the seat base is configured to be selectively translatable in the lateral direction.

15. The wheelchair of claim 1 further comprising a motor mounted on the support frame and adapted for driving the main wheels and for raising and lowering the seat base.

16. A wheelchair for transporting a patient, comprising:

a support frame having a front, a rear, and opposing sides, the front and rear facing in respective forward and aft directions, the opposing sides facing in opposing lateral directions;

at least two main wheels mounted on the support frame;

a seat base disposed upon the support frame between the main wheels and configured for selectively raising and lowering the patient between a first level and a second level; and at least one elongate security beam connected to the support frame at a pivot point and defining a longitudinal axis extending through the pivot point, the security beam being pivotable between a substantially vertical orientation and a substantially horizontal orientation about the pivot point located on the support frame adjacent one of the main wheels.

17. The wheelchair of claim 16 wherein the pivot point is located at the rear of the support frame.

18. The wheelchair of claim 16 wherein the pivot point is located above one of the main wheels.

19. The wheelchair of claim 16 further comprising:

a pair of horizontally pivotable arm rests, each one of the arm rests of the pair being substantially horizontally disposed above one of opposing sides of the seat base; wherein the pivot point is located at a rear of one of the arm rests, the security beam being moveable independent of the arm rest.

20. The wheelchair of claim 16 further comprising a pair of anti-tip booms, each one of the anti-tip booms of the pair being substantially horizontally disposed and projecting in a forward direction adjacent a main wheel for stabilizing the wheelchair in the forward direction.

21. The wheelchair of claim 16 wherein the security beam is configured to be selectively raised and lowered.

22. The wheelchair of claim 16 wherein the security beam is axially extendable along the longitudinal axis.

23. The wheelchair of claim 16 further comprising at least one transit wheel mounted on the support frame.

24. The wheelchair of claim 23 wherein the transit wheel is mounted in one of a forward and an aft location relative to the main wheels.

25. The wheelchair of claim 16 further comprising a lifting mechanism configured for selectively raising and lowering the seat base.

26. The wheelchair of claim 16 further comprising a reclinable seat back pivotable between generally upright and reclined positions about an aft end of the seat base.

27. The wheelchair of claim 26 further comprising a detachable head rest disposed above the seat back.

* * * * *